(12) United States Patent
Leavitt et al.

(10) Patent No.: US 11,488,142 B2
(45) Date of Patent: Nov. 1, 2022

(54) ELECTRONIC PAYMENT PROCESSING

(71) Applicant: Boost Payment Solutions, Inc., New York, NY (US)

(72) Inventors: Dean Michael Leavitt, Scarsdale, NY (US); James Edward Lister, New York, NY (US)

(73) Assignee: Boost Payment Solutions, Inc., New York, NY (US)

( * ) Notice: Subject to any disclaimer, the term of this patent is extended or adjusted under 35 U.S.C. 154(b) by 326 days.

(21) Appl. No.: 16/024,114

(22) Filed: Jun. 29, 2018

(65) Prior Publication Data
US 2018/0308090 A1 Oct. 25, 2018

Related U.S. Application Data

(63) Continuation-in-part of application No. 13/649,935, filed on Oct. 11, 2012, now abandoned.

(60) Provisional application No. 61/546,412, filed on Oct. 12, 2011.

(51) Int. Cl.
| | |
|---|---|
| *G06Q 20/40* | (2012.01) |
| *G06Q 20/34* | (2012.01) |
| *G06Q 20/12* | (2012.01) |
| *G06Q 20/08* | (2012.01) |
| *G06Q 20/02* | (2012.01) |

(52) U.S. Cl.
CPC ........ *G06Q 20/351* (2013.01); *G06Q 20/02* (2013.01); *G06Q 20/0855* (2013.01); *G06Q 20/12* (2013.01); *G06Q 20/40* (2013.01); *G06Q 2220/00* (2013.01)

(58) Field of Classification Search
CPC ...... G06Q 20/351; G06Q 20/02; G06Q 20/12; G06Q 20/40; G06Q 20/0855; G06Q 2220/00
See application file for complete search history.

(56) References Cited

U.S. PATENT DOCUMENTS

| | | | |
|---|---|---|---|
| 8,768,838 B1* | 7/2014 | Hoffman | G06Q 40/00 705/72 |
| 2007/0203836 A1* | 8/2007 | Dodin | G06Q 20/223 705/44 |
| 2008/0222046 A1* | 9/2008 | McIsaac | G07F 7/1016 705/64 |
| 2011/0246367 A1* | 10/2011 | Li | G06Q 20/14 705/44 |
| 2011/0320354 A1* | 12/2011 | Coon | G06Q 20/40 235/380 |
| 2012/0158566 A1 | 6/2012 | Fok et al. | |

(Continued)

*Primary Examiner* — Patrick McAtee
*Assistant Examiner* — Nakia Leffall-Allen
(74) *Attorney, Agent, or Firm* — Quinn IP Law

(57) ABSTRACT

An encrypted payment message is received from a buyer relating to a transaction with a merchant. The encrypted payment message is parsed using a first parsing algorithm to obtain merchant identifying information. The encrypted payment message is further parsed using a second parsing algorithm associated with the merchant identifying information, to obtain at least some payment information for the transaction. The payment information is submitted to a third party settlement processor on behalf of the merchant, using a payment algorithm. The result of the transaction is reported to at least one of the merchant and the buyer.

12 Claims, 6 Drawing Sheets

(56) References Cited

U.S. PATENT DOCUMENTS

2014/0108263 A1\* 4/2014 Ortiz .................... G06Q 20/36
705/44
2014/0279524 A1 9/2014 Slusser et al.
2017/0300879 A1\* 10/2017 Subramanian ..... G06Q 30/0206

\* cited by examiner 500, 500B

110

335, 335A

From: XYZBuyer <XYZAcounting@XYZBuyer.com>
Sent: September 30, 2012 10:29 AM
To: ABC Vendor Corp.<ABCCorp@boostintercept.com>
Subject: [encrypt] Payment details enclosed

235

Dear ALL,

This is a notification of payment details from Test Batch Corp:

345

| | |
|---|---|
| Transaction Amount: | $2.00 |
| Account Number: | 5186-0075-3100-7565 |
| Exp Date: | 12/12 |
| CVC2: | 352 |
| Valid from: | Sept, 30 2012 05:00:00 UTC |
| Valid to: | Dec, 01 2012 04:59:59 UTC |
| Single or Multi Use: | Single |
| Cardholder Name: | Test Batch Corp |
| Cardholder Address: | 2000 Purchase St |
| | Purchase, NY 10501 USA |

330

| | |
|---|---|
| Description: | batch transaction |
| Customer Account Number: | 1233456 |
| Payment Reference ID: | 9887665 |

280, 280A
To: janedoe@ABCCorp.com 280, 280B
From: Boost Payment Solutions <boostreporting@boostb2b.com>

Date: 11-MAR-12

155

This message is sent to you as a confirmation that the following charge has been authorized and settled into the following designated depository account (DDA account #). Should you have any questions regarding this payment, please call Boost Payment Solution at (888) 222-7122.

The details of this payment are as follows:

| Payment Date | Payment No. | Invoice No. | Amount | Currency | Payer Code | Event Code* |
|---|---|---|---|---|---|---|
| 11-MAR-12 | 3010006353 | ABC1231239 | $5.00 | USD | ABC | |
| 11-MAR-12 | 3010006353 | ABC1231240 | 5.00 | USD | ABC | |

340

Total Amount: $10.00

* Event Code may include GL, taxes, adjustments or any other details provided by payer.

ELECTRONIC PAYMENT PROCESSING

RELATED APPLICATION

This continuation-in-part application claims priority to and the benefit of U.S. patent application Ser. No. 13/649,935 filed Oct. 11, 2012 and to U.S. Provisional Application No. 61/546,412, filed Oct. 12, 2011, entitled "VIRTUAL CARD ACCEPTANCE," the contents of which are hereby incorporated by reference in their entirety.

TECHNICAL FIELD

The present disclosure pertains to a method and system for processing electronic payments from buyers to merchants.

BACKGROUND

Electronic systems for handling various payments between government, corporate, or institutional (i.e., non-consumer) customers (also referred to herein as "buyers"), and their merchants, suppliers, vendors and other payees (all of whom may sometimes be referred to as "merchants"), face challenges. For example, mechanisms are lacking for processing payments made via non-physical payment cards, i.e., payment card accounts lacking an actual physical plastic card. Non-physical payment cards may include a so-called "ghost card" as well as one-time use cards, often referred to as a "virtual card."

One present system requires a customer cardholder wishing to make a payment to its merchant, supplier or vendor (to the extent there is any difference between them, merchants, suppliers and vendors alike are referred to herein as merchants) to notify its issuing bank of its desire to do so. Notice may then be provided to the merchant, which must then enter card data, an amount of the payment, date of payment, invoice number(s), etc., to which the payment applies, and other payment-related data that may be required, into a point of sale terminal, processing software, or other card acceptance system that has been provided to the merchant by its merchant bank in order to submit card transactions for processing and ultimate funding. For a ghost card or a one-time use card, an e-mail notification may be sent to the merchant identifying invoices to be paid, the amount of each, and the overall payment amount to be applied to the card.

Further, present card payment mechanisms are fraught with security risks. For example, buyers are often exposed to fraud by merchants who, under present mechanisms, receive access to the buyer's cards data (account number, expiration date, etc.). Moreover, such security risks have engendered many and complex laws, rules, and regulations governing the security and compliance obligations to which card issuers and merchants must adhere. These laws, rules, and regulations cause transactions to be unduly difficult and expensive. In addition, the foregoing issues have slowed acceptance of use of payment cards for commercial transactions.

Thus, current processes are time-consuming, cumbersome, risky, and fraught with potential errors. Furthermore, in the likely event that the merchant participates in multiple virtual card and ghost card programs from multiple customers, the burden is amplified and further complicated by the fact that various virtual card programs have their own set of operational idiosyncrasies and logon credentials that must be managed by the merchant, and moreover ghost cards generally require the merchant to securely house the card information yet be able to quickly retrieve it to complete the payment instructions.

SUMMARY

A method for processing a payment message received from a buyer and including payment data for processing a payment to a merchant is provided. The method includes receiving, via computing device including a payment portal, an encrypted payment message from a buyer relating to a transaction with a merchant, where the payment portal comprises a server including a plurality of parsing algorithms including a first parsing algorithm and at least a second parsing algorithm. The method includes parsing, in the computing device and using a first parsing algorithm, the encrypted payment message to obtain merchant identifying information, where the merchant identifying information is an e-mail address assigned to the merchant and associated in the payment portal with the second parsing algorithm. The method includes further parsing the encrypted payment message using the second parsing algorithm, to obtain a token that has been generated by the buyer and included in the encrypted payment message, where the token identifies payment information including at least a number and an expiration date for a payment card. The payment information is encrypted and submitted to a third party settlement processor on behalf of the merchant, by selecting, using the payment portal, a payment algorithm associated with at least one of the merchant identifying information and the third party settlement processor and executing the payment algorithm.

A result of the transaction can be reported to at least one of the merchant and the buyer by selecting, using the payment portal, a reporting algorithm associated with the at least one of the merchant and the buyer, and executing the reporting algorithm to generate at least one of a notification email and a confirmation report. In an illustrative example, the result of the transaction that is reported can include at least one of an indication that the transaction was declined, and an indication of an amount to be paid to the merchant. The method can include using the merchant identifying information to obtain a merchant identifier that identifies the merchant; and using the merchant identifier to obtain some of the payment information. In one example, the method includes obtaining some of the payment information from at least one of an issuer site of an issuer and a buyer site of a buyer.

An apparatus including a computing device having a processor and a memory is provided. The memory of the apparatus stores instructions executable by the processor, including a plurality of parsing algorithms including a first parsing algorithm and at least a second parsing algorithm, such that the apparatus is configured to execute the method for processing a payment message received from a buyer and including payment data for processing a payment to a merchant described herein.

The above noted and other features and advantages of the present disclosure are readily apparent from the following detailed description when taken in connection with the accompanying drawings.

BRIEF DESCRIPTION OF THE DRAWINGS

FIG. 5 illustrates an example of payment data in the form of an email where the mode of payment is via a virtual card.

FIG. 6 illustrates an example of confirmation data in the form of an email to a merchant.

DETAILED DESCRIPTION

Introduction

Figure 1:
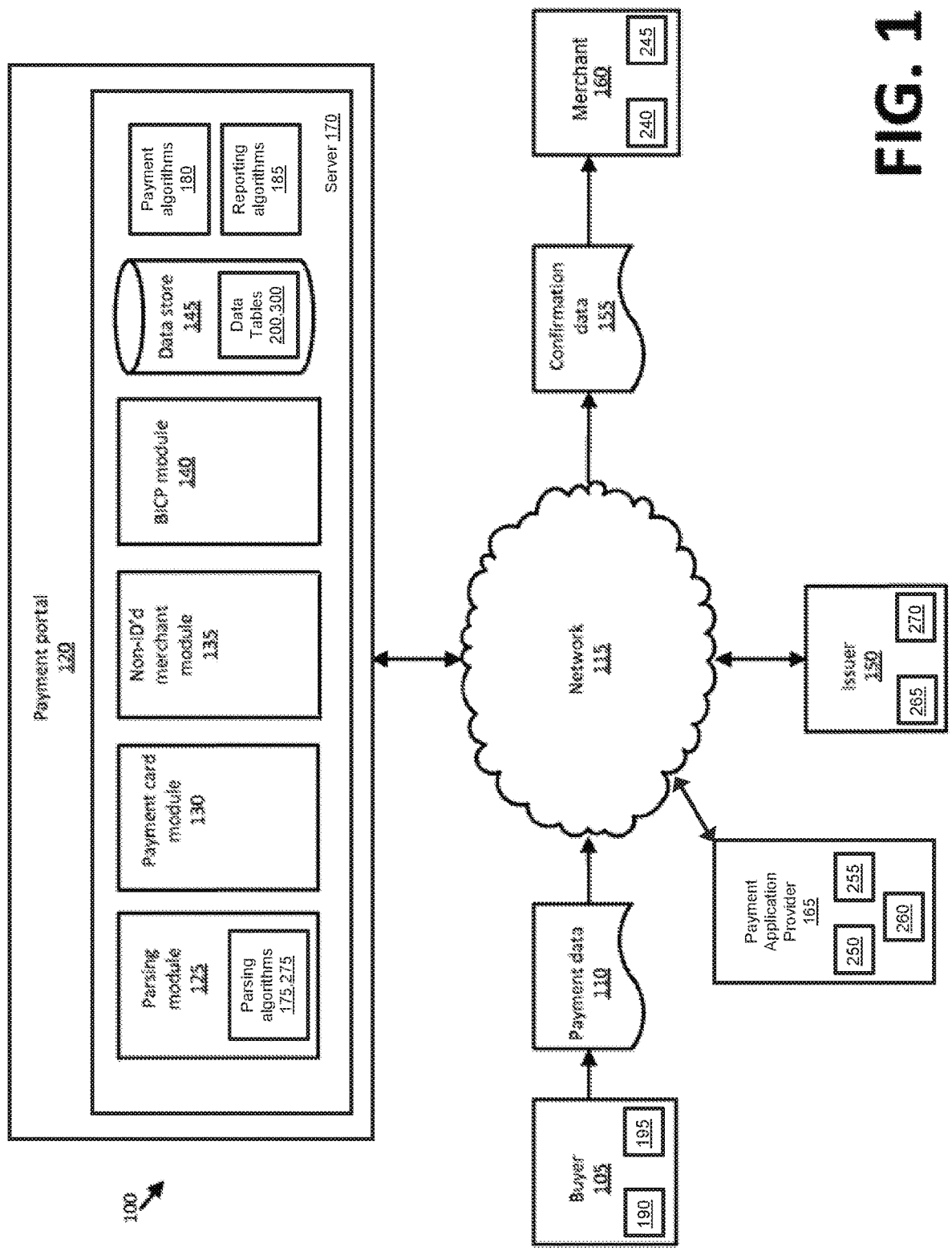
FIG. 1 is a block diagram of a system for processing payment card transactions.

Disclosed herein are certain systems, apparatuses, and methods, including methods and processes which may be embodied as algorithms and/or instructions stored on a computer-readable medium and executable by a processor. For example, mechanisms may be used to receive transaction-related data sent by a payment card issuer ("issuer"), or a third party serving as issuer's and/or payer's proxy, to a merchant via secure file transfer, secure e-mail, or secure facsimile. Alternatively or additionally, mechanisms may be used to retrieve transaction-related data from one or more issuer websites/portals and/or via an interne protocol IP connection or the like with such issuers on behalf of one or more merchants. Then, usernames, passwords and other security features embedded in such messages may be extracted, whereupon a logon to an issuer's virtual card website/portal may be performed. Secure card data intended for the merchant and related to the payment transaction may then be accessed. The issuer or buyer may opt to provide payment instructions via a direct secure connection to expedite the delivery of payment transaction process.

Once transaction data is accessed, card data may be associated with the merchant's unique merchant ID ("MID") and invoice information to which the payment applies. After the card data, MID and invoice information are associated, or matched, payment may be processed on behalf of the merchant that has provided authorization to facilitate its transactions, thereby eliminating the need for the merchant to access payment transaction data and process the transaction at the direction of its customer itself.

Upon the authorization and settlement (or declination) of a transaction, a merchant may be notified via one or more mechanisms, including e-mail, facsimile, or an IP connection, that the transaction has been completed and that the funds will be deposited into the merchant's designated depository account. The original buyer notice for a call to action by the merchant is converted to a notification that the action has been successfully completed. If declined, a reason code and descriptor may be provided to the issuer or customer/buyer so that the merchant will not have to deal with buyer-issuer directed payment declines.

To facilitate the foregoing mechanisms, a merchant generally will provide necessary permissions and proxies giving authorization to receive card data and process such transactions on the merchant's behalf and will generally provide instructions (e.g., via a specially assigned email address) to the ghost/virtual card issuing bank to redirect (or send a copy of) all ghost/virtual card-related messages scheduled to be delivered to the merchant via a specified mechanism such as the specially assigned e-mail address. Certain issuers may have the capability to transmit such messages directly via a secure IP connection in lieu of an e-mail/facsimile.

Credits are generally not allowed with virtual cards (e.g., because they are single-use), but a credit refund can be issued on a ghost card. In this case, an issuer's communication, e.g., e-mail, may be re-directed to the merchant. The merchant may then be required to provide a confirmation to process the refund before the transaction is securely processed on the merchant's behalf.

In general, card data is not exposed to the merchant (i.e., the merchant) at any time, as Payment Card Industry Data Security Standard (PCI DSS) compliance is maintained. Thus, the presently disclosed mechanisms advantageously create a secure environment in which the risk of merchant fraud is greatly reduced. Further, because the merchant never accesses card data, the merchant is advantageously relieved of obligations to adhere to various security requirements, such as PCI requirements.

In short, the present disclosure includes mechanisms by which a buyer-initiated one time use or ghost transaction may be processed on behalf of a merchant. That is, a transaction may be proxied, or emulated, on behalf of a merchant in a manner that yields the same result for a merchant as a transaction in which the buyer initiates a transaction directly to the merchant (i.e., supplier), but with significant efficiencies for the supplier and greatly reduced risk for all parties (e.g., the card issuer, the buyer, and the merchant).

System Overview

FIG. 1 is a block diagram of a system 100 for processing payment card transactions. A buyer 105 transmits sends a payment message 500 that includes payment data 110, e.g., via a network 115, to a payment portal 120, and includes a merchant identifier, such as the name of a merchant 160 to which the payment is directed, a merchant ID 285 assigned to the merchant 160, and/or a destination email address which includes a merchant assigned email 235. Various modules such as a parsing module 125, a card payment module 130, a non-identified merchant module 135, a buyer-initiated card payment (BICP) module 140, etc., may be included in the portal 120, which may also include a data store 145. The different modules 125, 130, 135, 140 may process different kinds of data and/or transactions using algorithms and/or instructions which may be stored within the different modules 125, 130, 135, 140 and/or in the data store 145 and/or in one or more servers 170 hosting the payment portal 120. In one example, the parsing portal 125 includes a plurality of parsing algorithms 175, 275, including at least one identifying parsing algorithm 175 for parsing the payment message 500 to obtain the merchant identifying information such as the merchant ID 285 and/or the assigned merchant email 235 and/or to obtain buyer identifying information such as a buyer email 335 and/or the name of the buyer 105, and further including a plurality of information parsing algorithms 275 for parsing various formats of payment messages 500 which are received by the payment portal 120 to obtain payment data 110, as described in further detail herein. In one example, the payment portal 120 includes a plurality of payment algorithms 180 for processing the various types of payments as directed by the buyer 105 via the payment message 500, as described in further detail herein. In one example, the payment algorithm 180 can be configured to encrypt payment information prior to submission to a payment application provider 165, and/or submit payment information to a payment application provider 165, such as a third party processor, on behalf of the merchant 160. For example, the payment portal 120 can include a payment algorithm 180 for processing a buyer-initiated card payment (BICP) transaction, another payment algorithm 180 for processing a ghost card payment, another payment algorithm 180 for processing a single use card payment, another payment algorithm 180 for processing a gateway payment, another payment algorithm 180 for processing a third party processor payment, another payment algorithm 180 for processing a tokenized payment, etc. The examples are non-limiting, and it would be understood that the payment portal 120 can include a payment algorithm 180 for at least each type of payment application 290 for which a merchant 160 is registered, e.g., for each type of payment application 290 shown in a merchant profile table 200.

The payment algorithms 180 can be stored in the payment portal 120 such that the payment algorithms 180 are accessible by one or more of the modules 125, 130, 135, and 140. In one example, the payment algorithms 180 are stored in the portal data store 145. Information obtained from the payment data 110 during parsing of a payment message 500 by an identifying parsing algorithm 175 and/or an information parsing algorithm 275 can be used by the payment portal 120 to select the one of the plurality of payment algorithms 180 corresponding to the payment data 110, such that the selected corresponding payment algorithm 180 can be used to process the payment authorized by the payment message 500. The payment data 110 may be formatted for transmission to an issuer 150 and/or a payment application provider 165 in the payment message 500.

In a process described herein, the buyer 105, by agreement with the merchant 160, transmits the payment message 500 to the payment portal 120 rather than sending the payment message 500 directly to any one of the merchant 160, the issuer 150, or the payment application provider 165, such that the payment message 500 is intercepted by the payment portal 120 for processing of the payment data 110 in one or more of the modules 125, 130, 135, 140, including submission of the payment information to the issuer 150 and/or to a third party settlement processor 165 on behalf of the merchant 160, and confirmation of payment completion, whereupon the portal 120 sends confirmation data 155 to a merchant 160 in a reporting format 600 which is specified by the merchant 160. As such, the system and process described herein provides an advantage to the merchant 160 receiving payments from multiple buyers 105, which may be submitted in a variety of differing payment formats, by using the payment portal 120 to electronically parse and process the various payment messages 500 from the multiple buyers 105, rather than employing staff and other resources which would be required for the merchant 160 to manually perform the payment processing. Another advantage of the system 100 and process 700 described herein is the generation of a payment confirmation file and/or notification email 600 which is provided for each payment processed to the merchant 160 in a format which is specified for the merchant 160. By way of example, the payment information included in the payment confirmation file and/or notification email 600 can be formatted for downloading and/or direct input into the merchant 160 accounting system, improving the efficiency and accuracy of payment receipt reporting in the merchant 160 accounting system.

The buyer 105 is generally a purchaser of goods and/or services from the merchant 160. The buyer 105 generally includes one or more computing devices, which can include a buyer server 195 having computer-executable algorithms and/or instructions for formatting and sending payment data 110 as well as for performing other operations disclosed herein. As shown in FIG. 1, the buyer 105 is in communication with a network 115. In one example, the buyer is in communication with the network 115 via a buyer website 190.

The buyer 105 provides the payment data 110 in an electronic format, generally as a message 500 that may be referred to as a "payment message," such as in an email (see examples shown in FIGS. 5 and 6), on a webpage, in an Extensible Markup Language (XML) file format, a comma separated values (CSV) file format, an XML interchange format for common language (XCL), an ACH payment format, and so on. or according to some other electronic format. In one example, the payment message 500 can be sent from the buyer 105 directly to the payment portal 120, as illustrated by the example email message 500B shown in FIG. 5. In another example shown in FIG. 6, the buyer 105 can direct an issuer 150 and/or a payment application provider 165, as a proxy for the buyer 105, to send the payment message 500 to the payment portal 120, as illustrated by the example proxy email message 500A shown in FIG. 4. The payment message 500 and/or the payment data 110 in the payment message can be secured, for example, by encryption. The payment data 110 included in the payment message 500 includes information relating to the buyer 105, and generally further identifies one or more merchants 160 and one or more payments to be made to the one or more merchants 160. For example, payment data 110 may include a buyer identifier indicating a buyer 105, card data 345, invoice information 340 relating to one or more invoices, such as invoice amount(s), identifying numbers, an indicator concerning whether a card is a debit card or credit card, etc.

Figure 4:
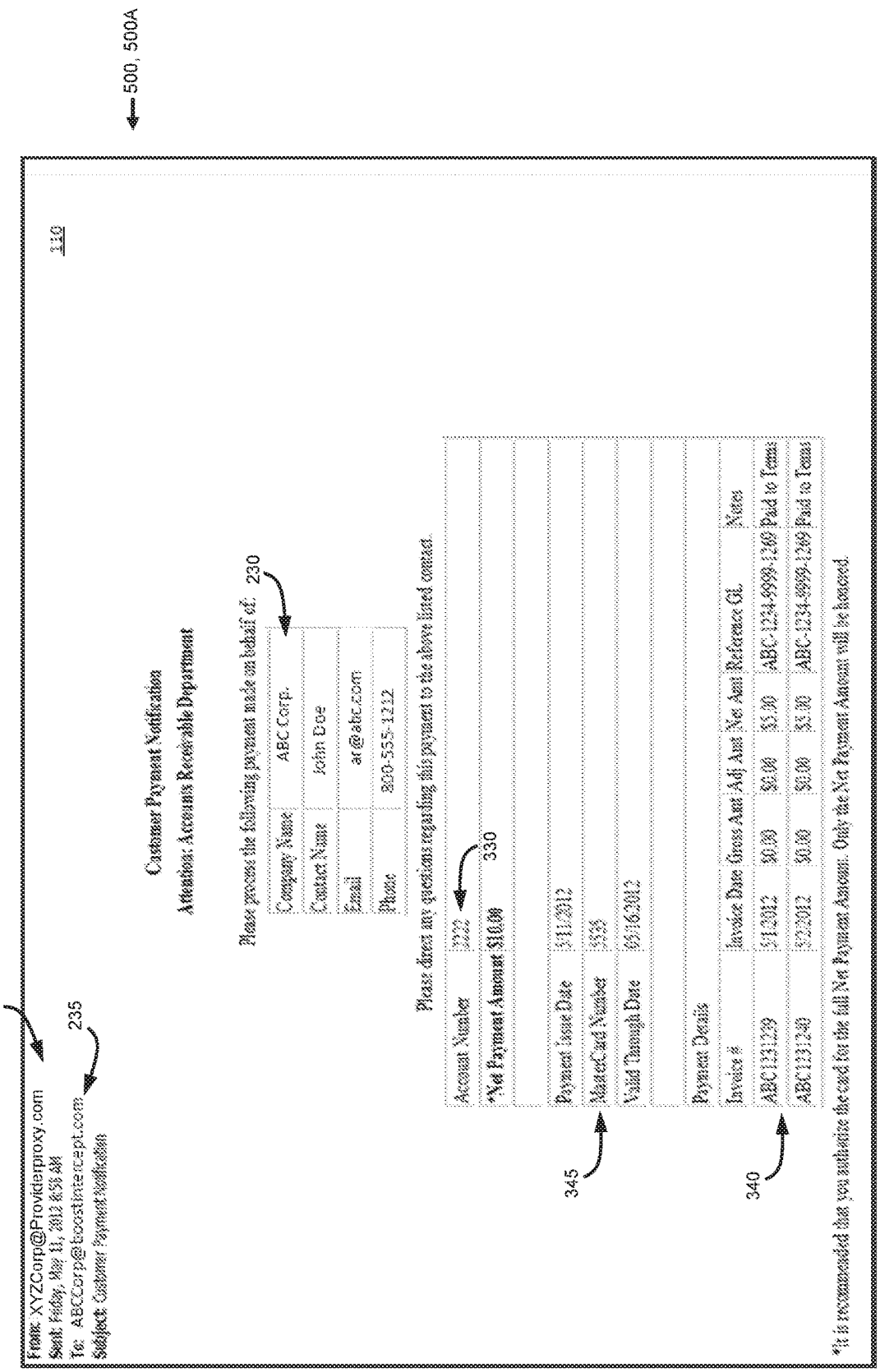
FIG. 4 illustrates an example of payment data in the form of an email where the mode of payment is via a ghost card.

In the examples shown in FIGS. 4 and 5, the sender email address is a buyer email 335 which provides buyer identifying information by which the buyer 105 initiating the payment transaction can be identified, and the destination email address is a merchant email address 235 which has been assigned by the payment portal 120 to the merchant 160 who is the intended recipient of the payment initiated by the buyer 105. The merchant email address 235 which has been assigned by the payment portal 120 to the merchant 160 by the payment portal may also be referred to herein as a merchant assigned email 235.

The buyer identifying information associated with each buyer 105 submitting a payment transaction for processing to the payment portal 120 is stored in the payment portal 120, for example, in the data store 145, and is associated in the data store 145 in a buyer profile table (not shown in figures) with the other information obtained from the buyer 105, for example, during registration of the buyer 105 to the payment portal 120. The data associated with each buyer 105 and stored in the data store 145 can include, by way of non-limiting example, the name of the buyer 105, one or more buyer email addresses 335 registered by the buyer 105 for use in submitting payment data 110 to the payment portal 120, other contact information for the buyer 105 including, for example, a street address, telephone number, the name of a buyer contact person, payment data 110 including, for example, a payment source type such as a payment application provider 165 and/or issuer 150 through which the payment by the buyer 105 will be transacted, and/or data specifying the format in which the payment data 110 will be received from the buyer 105. In a non-limiting example, the general contact information for the merchant 160 and/or the buyer 105, for example, the street address, telephone number, name of a buyer contact person, etc. may be stored in a remote data base and/or data management system (not shown in the figures) which is not included in the payment portal 120, and accessed and/or retrieved by the payment portal 120 from the remote data base as required. In an illustrative example, the remote data base and/or data management system can be a client relationship management (CRM) system such as SALESFORCE® or the like, which may be accessed, for example, through the network 115. Each of the buyer email addresses 335 registered by the buyer 105 can be associated in the data store 145 with a specific payment source type and/or a specific format in which the payment data 110 will be presented in the payment message 500 received from that buyer email address 334, and further associated with a specific information parsing algorithm 275 for parsing the specific format in which the payment data 110 is presented in the payment message 500 from that buyer email address 335. Further, each of the buyer email addresses 335 registered by the buyer 105 can be associated in the data store 145 with more than one specific payment source types and/or more than one specific formats in which the payment data 110 will be presented in the payment message 500 received from that buyer email address 335. For each one of the specific payment source types and/or for each one of the specific formats registered by the buyer 105, an information parsing algorithm 275 for parsing the specific format in which the payment data 110 is presented in the payment message 500 from the that buyer email address 335 can be selected from a plurality of information parsing algorithms 275 included in the parsing module 120 and associated in the data store 145 and/or in the buyer profile table with the buyer email address 335 and the respective one of the specific payment source types and/or specific formats registered by the buyer 105. The buyer profile information can be stored in the data store 145 such that the merchant profile table 200 and the data stored therein is accessible by each of the modules 125, 130, 135, and 140 in the payment portal 120.

The merchant identifying information associated with each merchant 160 receiving payments processed via the payment portal 120 is stored in the payment portal 120, for example, in the data store 145, and is associated in the data store 145 with the other information obtained from the merchant 160, for example, during registration of the merchant 160 to the payment portal 120. In an illustrative example shown in FIG. 2, the merchant identifying information is stored in a merchant profile table 200, which may be stored in the data store 145 such that the merchant profile table 200 and the data stored therein is accessible by each of the modules 125, 130, 135, and 140 in the payment portal 120. The data associated with each merchant 160 and stored in the data store 145 and/or the merchant profile table 200 can include, by way of non-limiting example, the name of the merchant 160, the merchant assigned email address 235 which is used as the destination address in payment messages 500 received by the payment portal 120 instructing payment to the merchant 160, other contact information for the merchant 160 including, for example, a street address, telephone number, the name of a merchant contact person, forwarding emails 280 for forwarding of payment reports and/or notification emails to the merchant 160 and/or to an administrator of the payment portal, depository account information for the merchant account into which the funds received from the payment transaction are to be deposited, payment data 110 including, for example, one or more payment applications 290 through which the payment by buyers 105 to the merchant 160 will be accepted for deposit into the merchant's depository account, and/or data specifying the format and/or one or more reporting algorithms 185 to be used to generate reports which are sent to the merchant 160, including for example, payment confirmation reports and/or notification messages 600. The one or more reporting algorithms 185 associated with the merchant profile information can be selected by the merchant 160 from a plurality of reporting algorithms included in the payment portal 120, such that the payment data 110, invoice information 340 and/or payment confirmation information included in the payment confirmation reports and/or notification messages 600 is in a format which is acceptable to the merchant 160. The process and system described herein is advantaged by associating a reporting algorithm 185 with a merchant 160, such that the merchant 160 can receive payment notification information in a format specified by the merchant 160 which preferably permits importation or transfer of the payment notification information into the merchant's accounting system with minimal or negligible manipulation, and in a format that invoice and payment information is easily matched in the merchant's accounting system to reconcile the buyer's account. By way of example, a reporting algorithm 185 can be configured to generate a payment confirmation report 600 in the format shown in FIG. 6, as a notification message including tabular data showing the invoice information 340 for the invoices and invoice amounts corresponding to the total payment amount made by the buyer 105. By way of example, other reporting algorithms 185 can be configured to generate a payment confirmation report 600 in a format that can be automatically uploaded into the accounts receivable application of the merchant 160. For example, a reporting algorithm 185 can be configured to generate a payment confirmation report 600 in an EDI format, another reporting algorithm 185 can be configured to generate a payment confirmation report 600 in Bank Administration Institute (BAI) file format, another reporting algorithm 185 can be configured to generate a payment confirmation report 600 in another of an industry format such as, by way of non-limiting example, an Extensible Markup Language (XML) file format, a comma separated values (CSV) file format, and an XML interchange format for common language (XCL), and so on. In one example, a reporting algorithm 185 can be configured to generate a payment confirmation report 600 in a proprietary format, where the format may be proprietary, for example, to the merchant 160 with which the reporting algorithm 185 is associated.

In the payment message 500A shown in FIG. 4, the buyer email 335A is a proxy email sent at the direction of the buyer 105 from a proxy which may be, for example, an issuer 150 or a payment application provider 165, such as a third party processor or value added reseller (VAR). In this example, the buyer email 335A provides identifying information which can be parsed by the parsing module 125 using an identifying parsing algorithm 175 to identify the buyer 105, in this example, "XYZ Corp" and to identify the payment application provider 165 sending the proxy payment message 500A, in this example, "Providerproxy.com" which may be a third party processor for processing the MASTERCARD® payment for which card data 345 and invoice information 340 is detailed in the payment data 110 of the payment message 500A. In this example, the parsing module 125 can then use the merchant identifying information and/or the buyer identifying information to select an information parsing algorithm 275 which has previously been associated in the payment portal 120 with the merchant 105 and/or the buyer 160. The payment data 110 in the payment message 500A is then parsed using the selected information parsing algorithm 275 to obtain the payment information required to process the payment requested by the payment message 500A. The parsed payment information is provided, via the portal, to one of the payment modules 130, 135, 140 for processing using a selected payment algorithm 180 associated with the payment application 290 specified in the payment message 500A. In the example shown in FIG. 4, the specified payment application 290 is a ghost card payment, as described in further detail herein.

In the example shown in FIG. 5, the payment message 500B is originated from a buyer email 335B and is sent directly from the buyer 105 to the payment portal 120. The payment message 500B includes payment data 110 including identifying information which can be parsed by the identifying parsing algorithm 175 to identify the buyer 105, in this example, "XYZ Corp" and the merchant 160 to which payment is being directed, in this example, "ABC Corp." Using the buyer identifying information including the buyer email 335B and/or the merchant identifying information including the merchant assigned email 235, the payment portal selects the information parsing algorithm 275 which has been previously associated with the buyer and/or merchant identifying information in the portal data store 145, and parses the payment data 110 in the payment message 500B to obtain the payment information required to process the payment requested by the payment message 500B. The parsed payment information is provided, via the portal, to one of the payment modules 130, 135, 140 for processing using a selected payment algorithm 180 associated with the payment application 290 specified in the payment message 500A. In the example shown in FIG. 4, the specified payment application 290 is a virtual single use card, as described in further detail herein.

The network 115 is generally a packet network, e.g., operating according to transfer control protocol/Internet protocol (TCP/IP). Although one network 115 is shown, the network 115 may include one or more networks and may include various elements such as switches, routers, convention computer servers, virtual computer servers, etc., the one or more networks being a network such as the Internet, a wide area network, a local area network, a cellular network, a wireless network, etc.

Payment portal 120 generally includes one or more computer servers 170, i.e., devices with one or more processors and one or more memories, that host one or more of the modules 125, 130, 135, 140. References herein to the payment portal 120 collectively encompass such one or more computer servers 170, which can also be referred to herein collectively as a portal server 170. In an illustrative example, the payment portal 120 can include and/or be configured as an internal portal including modules 125, 130, 135, 140 and algorithms 175, 275, 180 and 185, for receiving payment messages 500, payment data 110 and processing payment transactions on behalf of buyers 105 and merchants 160 as described herein. The payment portal 120 can be hosted within an intranet such that access to the payment portal 120, including access to the data store 145, modules 125, 130, 135, 140 and algorithms 175, 275, 180 and 185, can be limited to authorized users. Payment data 110 transmitted by buyers 105 can be received into the payment portal 120, and the payment portal 120 can generate reports, notification messages 600, etc. which are provided to merchants 160 and/or to buyers 105 from the payment portal 120, although it would be understood that neither buyers 105 nor merchants 160 would have access to the internal portal of the payment portal 120. In one example, the payment portal 120 can include an internal portal as described herein, and can further include an external portal, email server, website, website interface, or other means for communicating with the network 115 and through the network 115 with one or more of buyers 105, merchants 160, issuers 150 and payment application providers 165. The payment portal 120 selectively communicates, e.g., via the network 115, with one or more computer servers included in one or more buyers 105, one or more issuers 150, and/or one or more merchants 160.

In the example shown in FIG. 1, for simplicity of illustration, an example one of the one or more buyers 105 is shown including a buyer server 195 and a buyer website 190, an example one of the one or more issuers 150 is shown including an issuer server 270 and an issuer website 265, an example one of the one or more merchants 160 is shown including a merchant server 245 and a merchant website 240, an example one of the one or more payment application providers 165 is shown including a provider server 255, a provider website 240, and a provider data store 260, for example, for storing and/or processing card data 345 and/or token identifiers 295. In addition to the modules 125, 130, 135, 140, the portal 120 may include other modules, algorithms, and/or sets of computer-executable instructions for performing operations as disclosed herein. For example, the portal 120 generally includes parsing algorithms and/or instructions 175, 275 for receiving payment data 110, payment algorithms 180 for processing the payment according to the payment application 290 required by the payment data 110, reporting algorithms 185 for sending confirmation data 155 in a format prescribed by the merchant 160 receiving the confirmation data 155, and otherwise communicating with other elements in the system 100, managing communications between modules included within the portal 120, etc. By way of illustrative example, the parsing module 125 includes a plurality of parsing algorithms 175, 275 including at least one parsing algorithm 175 for initially parsing the payment message 500 to obtain the merchant identifying information, such as the merchant ID 285 and/or the assigned merchant email 235, and/or buyer identifying information such as the name of a buyer 105 or buyer email 335, which may be referred to herein as an identifying parsing algorithm 175, an identifying algorithm 175, or collectively as identifying parsing algorithms 175. The parsing algorithms 175, 275 include one or more additional parsing algorithms 275 for parsing various formats of payment messages 500 which are received by the payment portal 120 to obtain payment information 110 from the payment message 500, which may be referred to herein as an information parsing algorithm 275 or collectively, as information parsing algorithms 275. By way of example, the payment portal 120 can include a plurality of payment algorithms 180 for processing the various types of payments as directed by the buyer 105 via the payment message 500, and can include a plurality of reporting algorithms 185 for generating various types of notifications, reports, and communications as directed by the merchant 160, as described in further detail herein.

Figure 2:
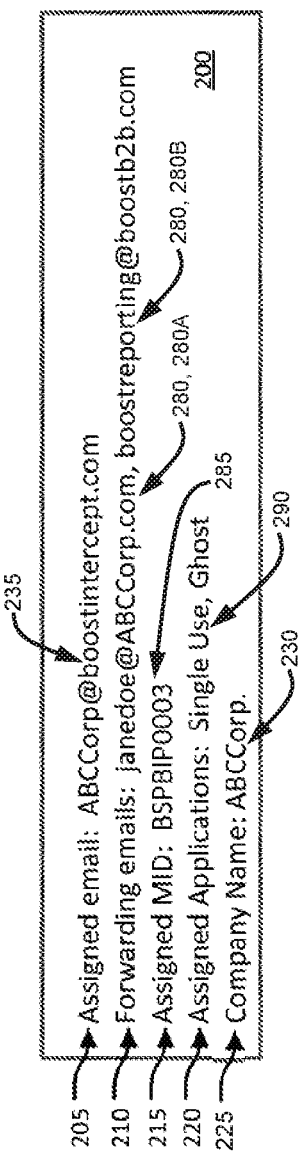
FIG. 2 provides an exemplary illustration of a merchant profile table.

The portal 120 generally also includes the data store 145, which may itself be a separate storage device and/or a database such as a relational database. In general, the data store 145 may be included in or communicatively coupled to a server 170 included in the portal 120. In any event, the portal data store 145 generally includes information for processing payment transactions on behalf of one or more merchants 160. As used herein, "merchant" refers to any party that is the recipient or intended recipient of a payment. Thus, information included in the data store 145 may include a merchant identifier 285, also referred to as a merchant ID 285, that uniquely or substantially uniquely identifies a merchant 160, one or more email addresses via which payment data 110 may be sent to the portal 120 on behalf of a particular merchant 160 by one or more buyers 105, information concerning how a payment is to be processed, for example, the payment applications 290 from which the merchant 160 will receive payment, and/or payment card information (e.g., an account number, expiration date, a security code, etc.), depository account information for how a payment is to be deposited to a merchant 160 account, as well as other information associated with a merchant, such as a company name, address, contact information, etc. Further details concerning exemplary information included in the data store 145 are provided below, including with respect to FIGS. 2 and 3. As described previously herein, the data store 145 can include information regarding each buyer 105 submitting payment instructions and/or payment messages 500 to the payment portal 120, including, for example, a buyer name, buyer email 335, payment application 290 information for payment applications used by the buyer 105, etc. In an example shown in FIG. 2, the information related to each merchant 160 can be stored in the data store 145 in a merchant profile table 200. Likewise, the information related to each buyer 105 can be stored in the data store 145 in a buyer profile table (not shown in the figures). The example shown in FIG. 2 is illustrative and non-limiting, and it would be understood that the profile tables for each of the merchants 105 and each of the buyers 160 could include additional data fields, including data fields storing a link or reference to one or more algorithms 175, 275, 180, 185 associated with the merchant 105 and/or the buyer 160 whose data is included in the profile table. The data stored in the portal data store 145 for each merchant 160 and buyer 105 can be collected, for example, during registration of the merchant 160 and/or buyer 105 to the payment portal 120.

The parsing module 125 parses payment data 110 to identify various information. For example, the parsing module 125 parses the payment data 110 first with an identifying parsing algorithm 175 to obtain information identifying a merchant 160 on whose behalf a payment is to be processed. For example, if payment data 110 is included in an email, the parsing module 125 may identify the destination address of the email, which then may be associated with a particular merchant 160 as described further below. That is, the portal 120 may receive email messages from a variety of sources including a variety of destination addresses. As described further below, by matching both a merchant ID 285 and a destination email address and/or other information included in payment data 110, the parsing module 125 may identify specific steps and/or a specific payment algorithm 180 for processing a payment transaction identified in the payment data 110. For example, a unique merchant email address 235 assigned to a merchant 160 may identify a merchant ID 285 associated with the merchant 160, which in turn provides a mechanism for looking up instructions and/or requirements specific to a merchant 160 and/or a buyer 105 in the data store 145, where the instructions can include instructions to use a specific information parsing algorithm 275 which is associated in the parsing module 125 with the specific merchant ID 285 and/or with the merchant assigned email 235, to parse the payment message 500 to obtain payment information from the payment message 500, using a specific payment algorithm 180 for processing the payment transaction identified in the payment data 110, and/or using a specific reporting algorithm 185 for generating reports, confirmation emails, etc. to the merchant 160 in a format specified by the merchant 160.

Information obtained by the parsing module 125 is used to determine what additional module or modules, and/or what additional algorithms 180, 185, 275 the portal 120 may use for processing a payment transaction indicated by the parsed payment data 110. For example, the card payment module 130 includes one or more payment instructions and/or algorithms 180, 185 for processing payment data 110 that can be matched to a merchant identifier 285 stored in the data store 145. The non-identified merchant module 135 includes instructions and/or algorithms 180, 185 for processing payment data 110 that cannot be matched to a merchant identifier 285 stored in the data store 145, e.g., that is sent to an email address not associated with any merchant identifier 285 in the data store 145. Further, the BICP module 140 and the associated payment algorithms 180, 185 may be invoked when the parsing module 125 determines that payment data 110 is intended to initiate a buyer-initiated card payment transaction, e.g., through a BICP specific payment gateway. Operations of the modules 130, 135, 140 are described further below.

Exemplary Data Elements

FIG. 2 provides an exemplary illustration of a merchant profile table 200 that may be included in the data store 145.

An assigned email field 205 stores an email address 235 assigned to a merchant, i.e., merchant 160, associated with a record in the table 200. This merchant assigned email address 235 may be used by the buyer 105, or often by a proxy for the buyer 105, as discussed below, to send payment data 110 to the portal 120. The portal 120 can parse a payment message 500 with an identifying parsing algorithm 175 to obtain and match a merchant assigned email address 235 in payment data 110 to a merchant assigned email address 235 stored in assigned email field 205, to identify a merchant 160 on whose behalf a payment transaction is to be processed.

A forwarding emails field 210 stores one or more notification email or other messaging addresses 280 to which payment data 110 is to be forwarded. For example, the portal 120 may include instructions to forward payment data 110 to the notification addresses 280 specified in the forwarding emails field 210. In the example shown in FIG. 2, the notification addresses 280 include a notification address 280A "janedoe@ABCCorp.com" for sending reporting information, such as a confirmation message 600, to a representative of the merchant 160 "ABCCorp", and another notification address 280B "bootreporting@boostb2b.com" for sending reporting information to the portal 120, for example, for storage to the data store 145 and/or to a transaction history file in the data store associated with the merchant 160 and/or the buyer 105. A reporting algorithm 185 corresponding to a reporting format specified by the merchant 160, for example, at registration of the merchant 160 to the payment portal 120, can be associated with the notification email addresses 280 such that, when a report is generated to the merchant 160, the associated reporting algorithm 185 is used to generated the report in the format specified by the merchant 160. Alternatively or additionally, the portal 120 may include instructions to send other information, e.g., confirmation data 155, to addresses specified in the forwarding emails field 210. In a non-limiting example, an example of a confirmation message 600 including confirmation data 155 is shown in FIG. 6. The confirmation data 155 includes in the example shown, includes invoice information 340 including the merchant's invoice number, the amount paid toward the invoice, and date the payment to the merchant 160 was confirmed.

An assigned merchant ID (MID) field 215 stores a unique or substantially unique identifier 285 for the merchant 160. The unique merchant identifier 285 may be referred to herein as a merchant ID, and is associated in the datastore 145 with the unique merchant assigned email address 235 assigned to the merchant 160. In one example, one or more of the algorithms 175, 275, 180, 185 are associated in the datastore 145 with the merchant ID 285 and/or the unique merchant assigned email address 235 for processing of payment data 110 received by the payment portal 120 related to the merchant 160 assigned the merchant assigned email address 235.

An assigned applications field 220 lists one or more payment applications 290 available to the merchant 160 associated with the given record in the table 200. Possible payment applications 290 include private label applications, electronic funds transfer, line of credit, credit card, etc., which can be processed through a payment application provider 165 such as, for example, a bank, third party processor, and/or payment gateway, as illustrated in the transaction reference table 300 shown in FIG. 3. For example, "Single Use" shown in the assigned applications field 220 specifies that an application 250 processing a payment utilizing a virtual, or single use, card may be used for transactions involving the merchant 160. "Ghost" shown in the assigned applications field 220 specifies that an application 250 processing a payment utilizing a ghost card may be used for transactions involving the merchant 160. In a non-limiting example, other types of payment applications 290 and payment application providers 165 are illustrated in the transaction reference table 300 shown in FIG. 3. For example, "Gateway," shown in FIG. 3, may be used to specify that a payment gateway, e.g., the MasterCard Payment Gateway, as a payment application provider 165 which may be used to process payments via the payment portal 120 for a merchant 160 assigned the merchant ID 285 "BSPRVJ7014." For example, the assigned applications field 220 can list a third party processor, sometimes referred to as a value-added reseller (VAR), where "VAR" specifies that payment data 110 may be sent to a value added reseller (VAR) or partner of the portal 120 for processing. In the example shown in FIGS. 2 and 3, a third party processor "VCP" is indicated as a payment application provider 165 for processing a tokenized payment for merchant 160 having the merchant name 230 "ABC Corp" having the merchant assigned email 235 "ABCCorp@boostintercept.com" and the assigned merchant ID 285 "BSPBIP0003".

Figure 3:
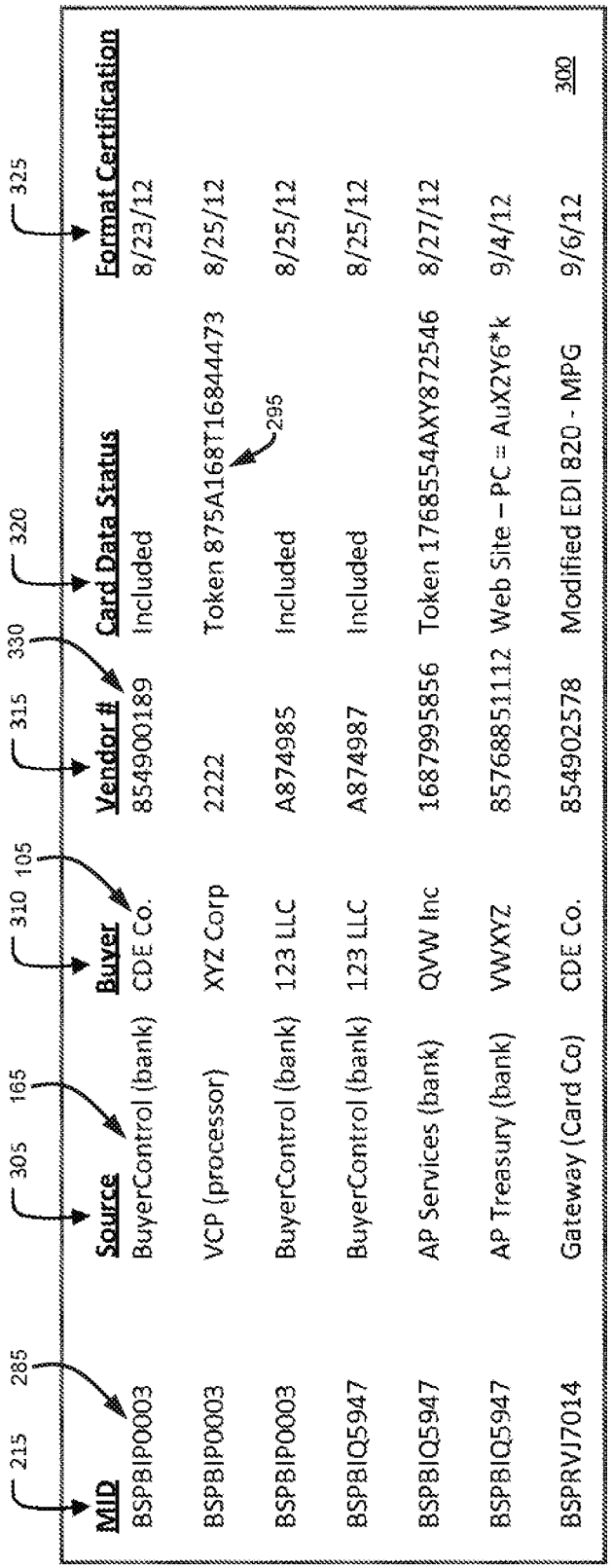
FIG. 3 provides an exemplary illustration of a transaction reference table.

A company name field 225 provides a merchant name 230 of the merchant 160. This merchant name 230 may be used in emails, reports, or the like. In the example shown, FIG. 3 provides an exemplary illustration of a transaction reference table 300 that may be included in the data store 145. Records in the transaction reference table 300 include a Merchant ID (MID) 215, described above with respect to FIG. 2.

Further, the transaction reference table 300 includes a source field 305. The source field 305 includes a source of payment data 110. As mentioned above, payment data 110 may be provided by a buyer 105, but often is provided only indirectly by the buyer 105, i.e., is provided by a payment processing entity, e.g., a payment application provider 165, on behalf of the buyer 105. Thus, the source field 305 identifies this entity, whether it be the buyer 105 itself an issuer 150, a payment application provider 165, or some other entity.

A buyer field 310 identifies the buyer 105. As just mentioned, in some cases, the data in the source field 305 may match the data in the buyer field 310. In the example shown in FIG. 3, merchant ID 285 "BSPBIP0003" assigned to merchant 160 "ABC Corp" is associated in the transaction reference table 300 with a plurality of different buyers 105 including buyers "CDE Co.", "XYZ Corp" and "123LLC". For each of these buyers 105, a source 305 of payment information 110, a vendor number 315 assigned by the respective buyer 105 to merchant 160 "ABC Corp", and a card data status 320 is shown. The payment portal 120 can associate with each respective combination of a buyer 105 and merchant 160, one or more algorithms 175, 275, 180, 185 for processing payment data 110 received directly or by proxy from that respective buyer 105 requesting processing of a payment to that respective merchant 160. In an illustrative example, referring to example payment message 500A shown in FIG. 4 initiated by a proxy for buyer 105 "XYZ Corp" to process a payment to merchant 160 "ABC Corp." using a ghost card which must be tokenized to submit the payment to the payment application provider 165 "VCP" identified in the transaction reference table 300 in FIG. 4 as associated with payment transactions between MID 285 "BSPBIP0003" (ABC Corp) and buyer 105 "XYZ Corp", the payment portal 120 can associate a plurality of algorithms with the respective combination of buyer 105 "XYZ Corp" and merchant 160 "ABC Corp" to process a payment transaction between buyer XYZ and merchant ABC, including a first algorithm which is an identifying parsing algorithm 175 to parse the incoming payment message 500A, a second parsing algorithm which is a selected information parsing algorithm 275 configured to parse for ghost card payment data 110 in the payment message format shown in the payment message 500A, a third algorithm which is a selected payment algorithm 180 configured to tokenize and process the ghost card payment data 110 parsed from the payment message 500A by the second parsing algorithm, and a fourth algorithm which is a selected reporting algorithm 185 for generating the confirmation message 600 to merchant ABC in a format specified by merchant ABC, as shown in FIG. 6.

Referring again to FIG. 3, the transaction reference table 300 can include a vendor number field 315 which stores a vendor number 330 used by the buyer 105 indicated in the buyer field 310 to identify the merchant 160 indicated by the merchant ID 285 in the MID field 215. The vendor number 330 is generally a unique or substantially unique merchant 160 identifier assigned by the buyer 105 to the merchant 160 within its accounts payable system. Further, a buyer 105 may associate one or more vendor numbers 330 with a merchant 160. For example, if the buyer 105 uses different vendor numbers 330 to manage different business segments within the buyer 105 organization, for different reporting needs or for different modes of payment with respect to one merchant 160, e.g., some invoices are paid with a ghost card and some invoices are paid with a virtual card, then the buyer 105 may have a first vendor number 330 for the merchant 160 indicating that the mode of payment is with a ghost card, and a second vendor number 330 for the same merchant 160 indicating a virtual card mode of payment.

A card data status field 320 includes information for obtaining payment card information. For example, "Included" in the field 320 indicates that card data, such as a card account number, expiration date, etc., is to have been included in the payment data 110 provided by the buyer 105 in the payment message 500. For example, payment data 110 may be an encrypted email, and the payment portal 120 and/or the parsing module 125 can include instructions to use an information parsing algorithm 275 configured to parse card data 345 from the encrypted email, and to use a selected one of the payment algorithms 180 which is configured to submit the card data 345 to a payment application provider 165, for payment processing.

An indication of a "Token" in the field 320, generally followed by a token identifier 295, is generally found where payment data 110 is to be used to process a payment using a ghost card. A token is a unique or substantially unique identifier for ghost card information, e.g., the card account number, expiration date, etc., and may be used to secure the ghost card information. The ghost card information, including a card number and other information necessary to place a charge on the ghost card, may be placed in a data store maintained by a third party processor 165 sometimes referred to as a value-added reseller (VAR), and which may be referred to herein as a payment application provider 165. The token identifier 295, used in lieu of the actual ghost card number, may be used to obtain authorization from a card issuer 150 to charge the ghost card. The payment portal 120 and/or the parsing module 125 can include instructions to use a selected one of the information parsing algorithms 275 configured to parse the ghost card data 345 from the payment data 110, and to use a selected one of the payment algorithms 180 which is configured to tokenize and process ghost card data to process the payment.

An indication of "website" in the field 320, generally followed by an identifier for a website, uniform resource locator (URL), etc. may indicate that payment card information is to be obtained from a third party website 250, 265 or buyer website 240, or some other remote mechanism, such as obtaining payment card information by a secure or unsecure messaging protocol, secure file transfer protocol (SFTP or FTPS), etc., as may likewise be indicated. The payment portal 120 and/or the parsing module 125 can include instructions to use a selected one of the information parsing algorithms 275 configured to parse website information from the payment data 110, and to use a selected one of the payment algorithms 180 which is configured to obtain process payment card information from a website and to submit the obtained information to a payment application provider 165, to process the payment.

Further, e.g., in cases where an application assigned to the merchant 160 includes a gateway, the field 320 may indicate a format for a file to be transferred to the gateway. For example, "Modified EDI 820" is a format for transferring payment data 110 to the MasterCard Payment Gateway. The payment portal 120 and/or the parsing module 125 can include instructions to use a selected one of the information parsing algorithms 275 configured to parse payment data 110 to obtain the information required to build the gateway file, and to use a selected one of the payment algorithms 180 which is configured to compile the payment data 110 in the file format required by the gateway and to submit the file to the gateway, to process the payment.

A format certification field 325 indicates a date on which a format notice for payment data 110 and/or confirmation data 155 has been certified, the process being a test that a payment message 500 in the form of an instruction, email or file, etc., has been received from the buyer 105, parsed using a first algorithm 175 to obtain merchant 160 and/or buyer 160 identifying information, parsed using a second parsing algorithm 275 to obtain payment data 110, that the payment data 110 including payment instructions in the payment message 500 were correctly being interpreted by the portal 120 and that a selected payment algorithm 180 corresponding to the payment application 290 designated by the payment data 110 was applied to process the payment using the appropriate payment application 290 and/or third party processing application 290, where the format notice sent to the merchant 160 and/or buyer 105 is formatted using a reporting algorithm 185 meeting the merchant 160 reporting requirements.

As described in additional detail herein, the tables 200 and 300 may be used together to process a payment transaction for a merchant 160. For example, the portal 120 may receive payment data 110 from a buyer 105 (or from a proxy for the buyer 105), whereupon the parsing module 125 or some other module in the portal 120 can execute an identifying parsing algorithm 175 to identify the destination email address that can be matched to a merchant assigned email address 235 in the assigned email field 205 in the merchant profile table 200. Accordingly, the portal 120 can determine the MID 285 stored in the MID field 215 associated with the received email address 235. The portal 120 may further identify a vendor number 330 in the payment data 110. The portal 120 may then query the transaction reference table 300 using the destination email address, e.g., the merchant assigned email address 235, and the vendor number 330 in the payment data 110 along with the MID 285 retrieved from the merchant profile table 200 to locate an appropriate record in the transaction reference table 300 for processing the payment or payments requested in the payment data 110. More specifically, the portal 120 may use contents of the card data status field 320 to obtain, in the cases of virtual card or ghost card transactions, payment card information or information on obtaining such information via a website, message 500, or the like, or, in the case of a transaction to be processed by a card provider gateway, information about a format of payment data 110 to be sent to the card provider gateway. The portal 120 can execute one or more algorithms 175, 275, 180, 185 associated with the appropriate record in the transaction reference table 300, e.g., associated with the specific combination of the merchant 160 identified by the MID 285 in the appropriate record, and the buyer 105 in the appropriate record, as described previously, to process the payment.

Payment Data Examples

FIG. 4 illustrates an example of payment data 110 in a payment message 500 which is in the form of a proxy email 500A where the mode of payment is via a ghost card, where the proxy email 500A is sent by a payment card issuer ("issuer") 150, or a third party serving as issuer's and/or payer's proxy, as described previously herein. The payment message 500 shown in FIG. A as an email 500A includes a destination address "ABCCorp@boostintercept.com" that may be recognized by the parsing module 125 and matched to a merchant assigned email address 235 stored in assigned email field 205. Further, an "Account Number" may be matched to data, such as a vendor number 330, in a vendor number field 315. Accordingly, the payment data 110 may be used, for example, by a payment algorithm 180 as described above to find or obtain a token that in turn may be used to access the ghost payment card information in a card data status field 320; note that the "MasterCard number" provided in the example of FIG. 4 is truncated. Ghost card numbers are generally not provided to buyers 105 in an e-mail notification or the like, but instead are provided once, and upon loading onto a third party processer secure card system 165 are tokenized and in the present example, the resulting token identifier 295 is stored in the table 300, such that the token identifier 295 may be passed to a card processor 165 to obtain payment card approval, for example, by executing a payment algorithm 180.

FIG. 5 illustrates an example of payment data 110 in a payment message 500 which is in the form of a secure email 500B where the mode of payment is via a virtual single use card. In the example shown in FIG. 5, the secure email 500B is secured by encryption, such that the payment data 110 included in the secure email 500B is encrypted. This email payment message 500B is similar to the email payment message 500A shown in FIG. 4; however, a full, rather than a truncated, card number is provided. Further, the "Customer Account Number" may be matched to data, such as a vendor number 330, in a vendor number field 315.

In another example of payment data 110 (not shown in the figures), the payment data 110 in a payment message 500 and/or other file format received by the payment portal 120, can be in the form of a "non-payment notice" received by the payment portal 120 from a third party which has processed the payment transaction on behalf of a buyer 105, including remittance and/or notification information from the third party including payment data 110 identifying the buyer 105, the merchant 160, the payment amount, and a confirmation that the payment transaction has been completed. As such, the term "non-payment notice" as used herein refers to payment data 110 received by the payment portal for a payment which has been completed by a third party in response to payment instructions provided to the third party by a requesting entity other than the payment portal 120. The requesting entity, when requesting the payment transaction through the third party, includes instructions to send the remittance and/or notification information confirming completion of the payment to the payment portal 120. In this way, the payment portal 120 can provide a consolidated report to a merchant 160 which includes both payments processed on behalf of the merchant 160 in response to instructions generated by the payment algorithms 185 of the payment portal 120, and payments processed on behalf of the merchant 160 in response to instructions from the non-portal requesting entity. The consolidated report, as previously described herein, is prepared using a reporting algorithm 185 which is specified by the merchant 160, for example, such that the report information, which may be provided in a predetermined file format such as XML, XCL, CSV, ACH, etc., can be imported directly into that merchant's account system, thus providing a time savings and reporting accuracy advantage to the merchant 160. In the present example, the third party providing the non-payment notice to the payment portal 120 has been registered to the payment portal and provided a destination email for use in transmitting the non-payment information to the payment portal and/or has included other identifying information in the payment message 500 and/or file received by the payment portal 120, such that when the non-payment notice is received and parsed by an identifying parsing algorithm 175, the parsing module 125 recognizes the incoming message and/or file as a non-payment notice and retrieves the information parsing algorithm 275 associated with the registered third party to then parse the incoming message and/or file to obtain the payment data 110 including payment remittance and/or confirmation information. In one example, the third party can be an issuer 150, a payment application provider 165, a gateway such a MASTERCARD® gateway or a VISA® gateway, or the like, where the buyer 105 is required to input payment information directly into an interface provided by the third party, and/or where the third party generates payment confirmation information in a fixed format which is different from the reporting format requested by the merchant 160. In this example, the third party provides the confirmation information in the third party format to the payment portal 120 as a non-payment notice, and the payment portal 120, using for example, a reporting algorithm 185 associated with the merchant 160, reports the third party payment to the merchant 160 in the format request by the merchant 160. In one example, reporting of payments which are processed through the payment portal 120 and payments processed by the third party can be combined in a consolidated report to the merchant 160, to enable the merchant 160 to import the consolidated payment directly from the report into the merchant 160's accounting system.

In another example of payment data 110 (not shown in the figures), the payment data 110 in a payment message 500 and/or other file format received by the payment portal 120, can include payment data 110 which is in a foreign language and/or a foreign currency, e.g., in a language and/or currency which is other than the language and/or currency in which the payment portal 120 is configured to operate. For example, the payment portal 120, when configured to operate with English and U.S. dollars as the default language and currency, would recognize, for example, payment data 110 in Chinese and/or Chinese Yuan, during parsing of the payment data 110, and process the payment message 500 and/or payment data 110 based on one or more algorithms 175, 275, 180, 185 associated with the processing of foreign language and/or foreign currency payment transactions, which can include, for example, redirecting processing of the payment transaction to a processor in a country qualified to process the foreign currency transaction.

Process Flow

FIG. 6 illustrates an example of confirmation data 155 generating by a reporting algorithm 185 associated in the form of a merchant notification email 600 notifying the merchant 160 identified in the forwarding e-mails field 210 of FIG. 2 which indicate that the payment instruction from the buyer 105 has been successfully authorized, will be settled and funding released into the banking network on or about the next available banking day. If the payment fails to be authorized, the transaction and detail concerning the declined payment will be routed to a customer service contact to reconcile through a help desk or the like, or to inform the buyer 105 or issuer 150 of the reason for the decline. The example shown in FIG. 6 is illustrative and non-limiting, and it would be understood that other reports can be generated to a merchant 160 and/or to a buyer 105 using one or more reporting algorithms 185 which are associated with the merchant 160 and/or buyer 105, for example, during registration of the merchant 160 and/or buyer 105 to the payment portal 120. By way of illustration, the confirmation data 155 for payments made to a respective merchant 160 can be consolidated into a report, which can be in the form of a message, a file such as an XML, XCL, ACH, CVS or other file format, for confirmed payments meeting one or more criteria specified by that respective merchant 160, where the reporting criteria can include, for example, all buyers 105 submitting payments to the respective merchant 160, a single buyer 105, or a group of buyers 105, a specific time frame such as a day, week, month, quarter, year, etc., a specific geographic area such as a state, country, region, continent, etc., a merchant or buyer location and/or division such as a headquarters, sales office, manufacturing plant, distributor, etc., a currency type, and the like, where the specific report format requested by the merchant 160 can be associated with and/or provided by a reporting algorithm 185. Likewise, the payment requests and/or confirmation data 155 for a respective buyer 160 can be consolidated into a report, which can be in the form of a message, a file such as an XML, XCL, ACH, CVS or other file format, for payments meeting one or more criteria specified by that respective merchant 160, where the reporting criteria can include, for example, all merchants 160 receiving payments from the respective buyer 105, a single merchant 160 or a group of merchants 160 receiving payments from the respective buyer 105, a specific time frame such as a day, week, month, quarter, year, etc., a specific geographic area such as a state, country, region, continent, etc., a merchant or buyer location and/or division such as a headquarters, sales office, manufacturing plant, distributor, etc., a currency type, and the like, where the specific report format requested by the buyer 160 can be associated with and/or provided by an associated reporting algorithm 185.

Figure 7:
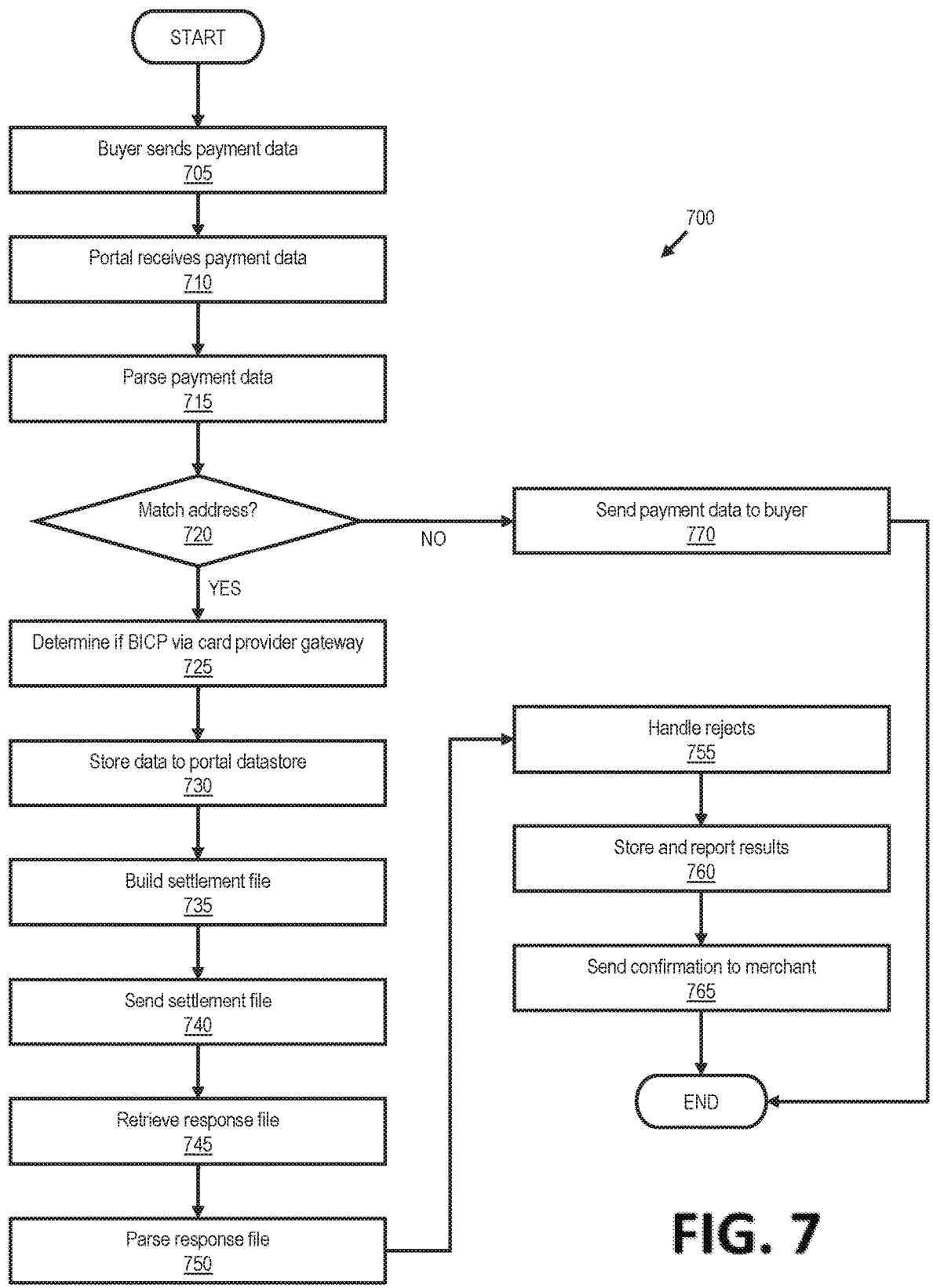
FIG. 7 illustrates an exemplary process for processing a payment on behalf of the merchant.

FIG. 7 illustrates an exemplary process 700 for processing a payment on behalf of the merchant 160. The process 700 begins in a step 705, in which a buyer 105 (or an entity or proxy acting in behalf of the buyer 105) sends payment data 110, e.g., via the network 115 using payment message 500, which can be configured as an e-mail, an attachment to an e-mail, or some other mechanism such as described above, to the payment portal 120.

Next, in a step 710, the portal 120 receives the payment data sent in step 705.

Next, in a step 715, parsing module 125 parses the payment data 110 received in step 710 using a identifying parsing algorithm 175 to obtaining identifying information from the payment data 110, which can include information identifying the buyer 105 sending the payment data 110 and/or the merchant 160 to whom the payment instructed by the payment data 110 is to be made. The parsing module 125 and/or the identifying parsing algorithm 175 can identify a destination email address, which can be a merchant assigned email 235, or other address or identifying information in the data 110 for use in matching the payment data 110 and/or payment message 500 to data in a respective merchant profile table 200.

Next, in a step 720, the parsing module 125 or some other module or instructions included in the portal 120 determines whether a destination address or other identifying indicia parsed from the payment data 110 match data, for example, a merchant assigned email 235, in an assigned email field 205. If a merchant assigned email 235, a merchant ID 285 or like corresponding identifying information is found for the payment data 110, then step 725 is executed next. Otherwise, step 770 is executed next.

Step 725 includes determining the form or type of payment application 290 indicated by the payment data 110 parsed from the payment message 500, including, for example, determining whether the portal 120 is to process a payment transaction identified in the payment data 110, or whether the one or more payment transactions identified in the payment data 110 are to be sent to a payment application provider 165 such as a card provider payment gateway, e.g., the MasterCard Payment Gateway. For example, payment data 110 will generally include an indicator that a transaction is a buyer initiated card payment (BICP), or such determination may be made where payment data 110 lacks a card number or other payment card information, in which case BICP module 140 may execute remaining steps of process 700. At step 725, the payment portal 120 and/or the parsing module 125, using the merchant identifying information parsed from the payment data at step 715, identifies the merchant profile table 200 corresponding to the merchant 160 identified from the payment message 500. Using a selected information parsing algorithm 275 associated in the data store 145 with the merchant 160, the merchant assigned email 235, and/or the merchant ID 285 associated with the merchant 160 identified from the payment data 110 in the payment message 500, the selected information parsing algorithm 275 parses the payment data 110 to identify, for example, information in the payment data 110 matching the payment data 110 to a record in a transaction reference table 300, by matching the payment data 110 to one or more of a merchant ID 285 in a merchant ID field 215, a payment application provider 165 in a source field 305, a buyer 105 in a buyer field 310, a vendor number 330 in a vendor number field 315, and/or the status of card data 345 as indicated in a card data status field 320, as described above. Further, the parsing module 125 and/or the information parsing algorithm 275 may identify other data such as described above, e.g., a card number or other card data 345, instructions for payments for one or more invoices, payment amounts for each invoice, etc. Using the information parsed from the payment data 110, and the respective record identified in the transaction reference table 300 as corresponding to the payment data 110, the payment portal identifies the payment application 290 and the selected one of the payment algorithms 180 to be used in processing the payment.

In some cases, the payment data 110 received with the payment message 500 may be an electronic file or the like that includes payment data 110 relating to multiple transactions possibly with multiple merchants 160. In that case, a merchant identifier 285, i.e., an address, a merchant name 230, or some other indicia identifying the merchant, may be included in the payment data 110. In an illustrative example, the identifying parsing algorithm 175 identifies multiple transactions and multiple merchants 160 in the payment data 110, such that the payment portal 120 can divide the payment data 110 into multiple subsets of payment data 110, each including only the payment data 110 related to a single merchant 160, for processing according to the method disclosed herein.

In step 730, information parsed from payment data 110 and/or identified from tables 200 and 300 using the parsed information is stored in the data store 145 and execution of the selected one of the payment algorithms 180 using the stored data is initiated. For example, in association with a merchant ID 285, a transaction amount, a date, an invoice number 340, a payment application 290, and other information could be stored. This information may then be used by the payment card module 130 and/or the selected payment algorithm 180 to build a settlement file.

Next, in a step 735, the payment portal 120, e.g., the payment card module 130 and/or the selected payment algorithm 180, builds a settlement file including records representing the payment or payments authorized in the payment data 110. The settlement file usually follows an established flat file format, e.g., a comma separated value (CSV) format as directed by a VAR, such as the Electronic Data Interchange (EDI) modified 820 format used by a payment gateway.

Next, in a step 740, the payment card module 130 and/or the selected payment algorithm 180 encrypts and sends the settlement file, e.g., via SFTP or FTPS, to an authorization and settlement module of a payment application provider 165 that is generally provided by or certified with a third party processor such as First Data Corp. or the like. In any event, the payment application provider 165 requests authorization from the appropriate issuer 150 for the requested payment or payments, and provides confirmation in response to the request for authorization. Occasionally, the authorization and settlement module returns a declination of a payment request.

In the event a file is generated to a card provider for buyer initiated payment processing, only an electronic confirmation of receipt of file is received (see step 760) and no other action or steps need be taken as the respective gateway performing the payment processing also performs the confirmation of notification to the merchant 160 upon successfully processing the transaction.

Next, in a step 745, the payment portal 160 receives the response from the authorization and settlement module of approval or decline of the payment request.

Next, in a step 750, the payment card module 130 and/or the selected payment algorithm 180 parses the response received in step 740.

Next, in a step 755, in the event any payment request was declined or there was some error in processing the transaction, the payment portal 120 and/or the payment card module 130 sends a communication, e.g., an email to the relevant help desk or customer service, to contact the buyer 105 and/or issuer 150 that provided the payment data 110.

Next, in a step 760, results received from the authorization and settlement module of the payment application provider 165 are stored in data store 145.

Next, in a step 765, confirmation data 155 is compiled by a selected reporting algorithm 185 associated with the payment data 110 to generate a notification report in a format specified by the merchant 160, and is sent to the merchant 160. In one example, the notification report is in the form of a confirmation email 600 as seen in FIG. 6.

Following step 765, the process 700 ends.

In step 770, which may follow step 720 as described above, the portal 120 forwards, e.g., returns, the received payment data 110 to the buyer 105, e.g., according to instructions in the non-identified merchant module 135. Step 770 is generally performed in the case in which payment data 110 includes transactions from a buyer 105 relating to multiple merchants 160, where some of the merchants 160 participate in the portal 120, i.e., are registered to the payment portal 120 and are listed in the data store 145, e.g., in a respective merchant profile table 200, and others of the merchants 160 in the payment data are not found in the data store 145 and/or are not registered to the payment portal 120.

Following step 770, the process 700 ends.

The process flow 700 shown in FIG. 7 is illustrative and non-limiting, such that it would be understood that the payment process system 100 described herein can include other process flows and methods incorporating combinations of the system elements described herein.

Conclusion

Computing devices such as servers included in the portal 120, etc., may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as those discussed herein generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, html, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, e.g., data store 145, etc., may include various kinds of mechanisms for storing, accessing, and retrieving various kinds of data, including a hierarchical database, a set of files in a file system, an application database in a proprietary format, a relational database management system (RDBMS), a non-relational database management system, etc. Each such database or data store is generally included within a computing device employing a computer operating system such as one of those mentioned above, and may be accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Data store 145 may be any of a variety of known RDBMS packages, including IBMS DB2, or the RDBMS provided by Oracle Corporation of Redwood Shores, Calif. Non-relational database management systems may be any of a variety of known packages, including NoSQL, MongoDB, etc.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed teachings.

Accordingly, it is to be understood that the above description is intended to be illustrative and not restrictive. Many embodiments and applications other than the examples provided would be apparent to those of skill in the art upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the present teachings are capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method for securing information over an electronic network via a computer server, the method comprising:
   associating in a payment portal, via a computer server including the payment portal, merchant identifying information with a merchant;
   assigning, in the payment portal, a merchant email address to the merchant;
   wherein the merchant identifying information includes the merchant email address assigned to the merchant;
   associating, in the payment portal, an information parsing algorithm with the merchant email address;
   receiving, via the payment portal, an encrypted payment message from a buyer server;
   wherein the encrypted payment message includes a token generated by the buyer;
   wherein the token identifies payment information including at least a number and an expiration date for a payment card;
   wherein the payment portal comprises a plurality of parsing algorithms including an identifying parsing algorithm and the information parsing algorithm;
   parsing, in the computer server and using the identifying parsing algorithm, merchant identifying information from the encrypted payment message;
      parsing, using the information parsing algorithm, the token from the encrypted payment message;
   determining, via the payment portal and using the token, the payment information; and
   encrypting, via the payment portal, the payment information;
   associating, via the payment portal, a merchant identifier with the merchant identifying information; wherein the merchant identifier is configured to identify the merchant;
   determining, via the payment portal and using the merchant identifier, some of the payment information; and
   retrieving, via the payment portal and using the merchant identifier, some of the payment information from at least one of an issuer website of an issuer of the payment card, an issuer server of the issuer, a buyer website of the buyer, or a buyer server of the buyer.

2. The method of claim 1, wherein the encrypted payment message is related to a payment card transaction with a merchant, the method further comprising:
   submitting to a provider server of a third party settlement processor, via the payment portal in communication with the provider server, a payment request including the encrypted payment information;
   receiving from the provider server, via the payment portal, a response to the payment request; and
   reporting to at least one of the a merchant and the buyer server, via the payment portal, the response.

3. The method of claim 2, wherein the response includes an indication that the transaction was declined.

4. The method of claim 2, wherein the response includes an indication of an amount to be paid to the merchant.

5. The method of claim 2, further comprising:
   associating, via the payment portal, a payment algorithm with at least one of the merchant identifying information and the third party settlement processor;
   selecting, via the payment portal, the payment algorithm associated with the at least one of the merchant identifying information and the third party settlement processor; and
   processing the payment request via the payment algorithm.

6. The method of claim 2, wherein reporting the response to the payment request to the at least one of the merchant and the buyer further comprises:
   associating, via the payment portal, a reporting algorithm with the at least one of the merchant and the buyer;
   selecting, using the payment portal, the reporting algorithm associated with the at least one of the merchant and the buyer; and
   wherein the response includes a report which includes at least one of a notification email and a confirmation report;
   generating the report via the reporting algorithm.

7. An apparatus for securing information over an electronic network via a computer server, the apparatus comprising a computing device having a processor and a memory, the memory storing instructions executable by the processor such that the apparatus is operable to:
   associate in a payment portal, via a computer server including the payment portal, merchant identifying information with a merchant;
   assign, in the payment portal, a merchant email address to the merchant;
   wherein the merchant identifying information includes the merchant email address assigned to the merchant;
   associate, in the payment portal, an information parsing algorithm with the merchant email address;
   receive, via the payment portal, an encrypted payment message from a buyer server, the encrypted payment message relating to a payment card transaction with a merchant;
   wherein the encrypted payment message includes a token generated by the buyer;
   wherein the token identifies payment information including at least a number and an expiration date for a payment card;
   wherein the computing device comprises a plurality of parsing algorithms including an identifying parsing algorithm and the information parsing algorithm;
   parse in the computer server using the identifying parsing algorithm, merchant identifying information from the encrypted payment message;
   parse in the computer server using the information parsing algorithm, the token from the encrypted payment message;
   determine, via the payment portal and using the token, the payment information; and
   encrypt, via the payment portal, the payment information;

associate, via the payment portal, a merchant identifier with the merchant identifying information; wherein the merchant identifier is configured to identify the merchant;

determine, via the payment portal and using the merchant identifier, some of the payment information; and retrieve, via the payment portal and using the merchant identifier, some of the payment information from at least one of an issuer website of an issuer of the payment card, an issuer server of the issuer, a buyer website of the buyer, or a buyer server of the buyer.

8. The apparatus of claim 7, wherein the encrypted payment message is related to a payment card transaction with a merchant, the apparatus further operable to:

submit to a provider server of a third party settlement processor, via the payment portal in communication with the provider server, a payment request including the encrypted payment information;

receive a response to the payment request from the provider server, via the payment portal; and report to at least one of a merchant and the buyer server, via the payment portal, the response.

9. The apparatus of claim 8, wherein the response includes an indication that the transaction was declined.

10. The apparatus of claim 8, wherein the response includes an indication of an amount to be paid to the merchant.

11. The apparatus of claim 8, wherein the apparatus is further operable to:

associate, via the payment portal, a payment algorithm with at least one of the merchant identifying information and the third party settlement processor;

select, via the payment portal, the payment algorithm associated with the at least one of the merchant identifying information and the third party settlement processor; and process the payment request via the payment algorithm.

12. The apparatus of claim 8, wherein the apparatus is further operable to:

associate, via the payment portal, a reporting algorithm with the at least one of the merchant and the buyer;

select, using the payment portal, the reporting algorithm associated with the at least one of the merchant and the buyer; and wherein the response includes a report which includes at least one of a notification email and a confirmation report;

generate the report via the reporting algorithm.

* * * * *